United States Patent [19]

Lightenberg et al.

[11] E Re. 29,956

[45] Reissued Apr. 3, 1979

[54] LUMINESCENT SCREEN HAVING A MOSAIC STRUCTURE

[75] Inventors: Martinus A. C. Lightenberg; Albert L. N. Stevels; Agnes D. M. De Pauw, all of Eindhoven, Netherlands

[73] Assignee: U.S. Philips Corporation, New York, N.Y.

[21] Appl. No.: 858,100

[22] Filed: Dec. 7, 1977

Related U.S. Patent Documents

Reissue of:

[64] Patent No.: 3,825,763
Issued: Jul. 23, 1974
Appl. No.: 270,494
Filed: Jul. 10, 1972

[30] Foreign Application Priority Data

Jul. 10, 1971 [NL] Netherlands ..... 7109571

[51] Int. Cl.[2] ..... G01T 1/20
[52] U.S. Cl. ..... 250/486; 427/65
[58] Field of Search ..... 250/483, 486, 363 S, 250/367; 427/65

[56] References Cited

U.S. PATENT DOCUMENTS

| | | | |
|---|---|---|---|
| 3,011,919 | 12/1961 | Niklas | 250/367 |
| 3,041,456 | 6/1962 | Macleod | 250/486 |
| 3,509,341 | 4/1970 | Hindel et al. | 250/363 S |

*Primary Examiner*—Davis L. Willis
*Attorney, Agent, or Firm*—Carl P. Steinhauser

[57] ABSTRACT

In a luminescent layer which is composed of spatially separated areas for reduction of lateral light dispersion in the layer, this subdivision is realized by provision of a crack structure in the luminescent layer.

This crack structure is realized by thermal treatment of a layer which is provided on a substratum, and can be made optimum by an appropriate choice of the layer thickness, so that deposition in a plurality of sublayers can be advantageous. The crack structure can also be caused by a pattern which is provided in the substratum surface or by means of a gauze which serves as a substratum.

22 Claims, 3 Drawing Figures

LUMINESCENT SCREEN HAVING A MOSAIC STRUCTURE

Figure 1:
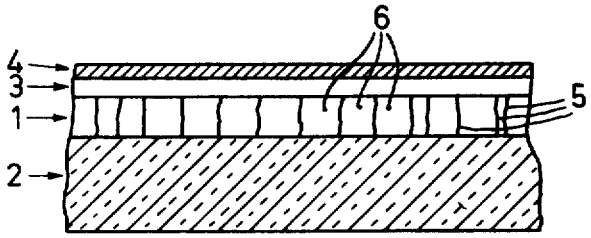

Matter enclosed in heavy brackets [ ] appears in the original patent but forms no part of this reissue specification; matter printed in italics indicates the additions made by reissue.

The invention relates to a luminescent screen comprising a layer of luminescent material which is composed of a mosaic pattern of areas which are spatially separated from each other.

A luminescent screen of this kind is known, for example, from U.S. Pat. No. 3,041,456. A common aspect of known luminescent screens of this kind is that the luminescent material is provided in a substratum on which walls for separating the areas from each other are already present. These methods are particularly laborious and often restrict the freedom of choice of the luminescent material, the substratum or the technique of depositing the luminescent material. Moreover, the areas of a mosaic structure thus obtained are too coarse for many applications.

The invention has for its object to eliminate these drawbacks and to this end a luminescent screen of the kind set forth is characterized in that the areas are delimited by cracks in the layer of luminescent material which are directed mainly transverse to the layer.

Figure 2:
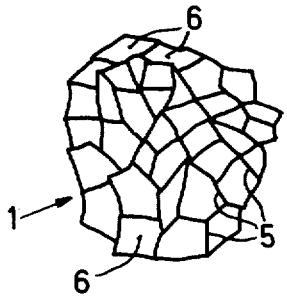
Figure 3:
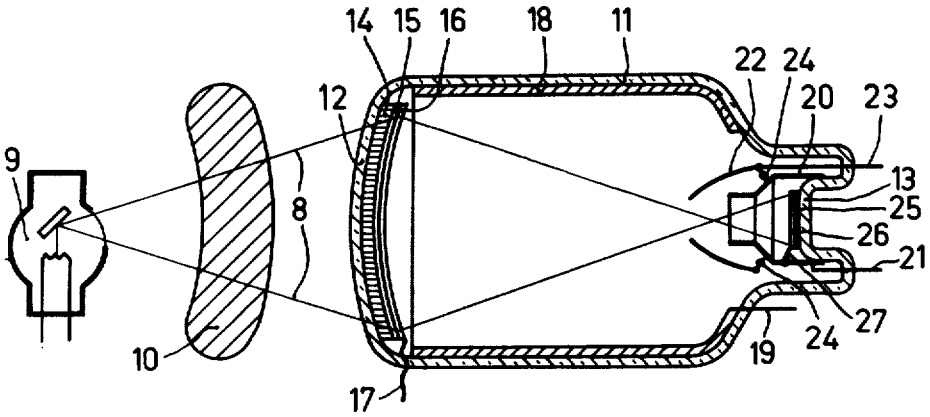

The invention provides a luminescent screen which can be readily manufactured, where the lateral dispersion of light through the layer is substantially reduced and where the luminescent material can be provided according to a technique which is appropriate for homogeneous layers. In a luminescent layer formed according to the invention a very fine crack structure can be realized, it being possible to adapt the dimension of the areas to the requirements to be imposed on the relevant layer in view of A preferred embodiment and a preferred application of a luminescent screen according to the invention will be described in detail hereinafter with reference to the diagrammatic drawing. In the drawing:

FIG. 1 is a diagrammatic cross-sectional view of a preferred embodiment of a luminescent screen according to the invention, FIG. 2 is a diagrammatic plan view of a luminescent screen according to the invention, and FIG. 3 is a diagrammatic view of an X-ray image intensifer, an entrance screen of which is formed by a luminescent screen according to the invention.

Provided in a luminescent screen as shown in FIG. 1 is a layer of luminescent material 1 which is deposited on a substratum 2. The substratum is usually made of glass, but can also be made of a metal, such as aluminium or titanium. A metal substratum can be used, for example, as an entrance window for comparatively hard X-rays and for fast electrons. For softer X-rays, for example, beryllium can be used as the substratum material. The luminescent material is provided on the substratum, for example, by letting a viscous mass composed of grains of luminescent material, such as zinc cadmium sulphide, and a binder flow on the substratum so as to form a thin layer thereon, and by subsequently hardening the layer thus formed. A luminescent layer of this kind, to be used for an X-ray luminescent screen, must ordinarily have a thickness of approximately 400 microns. Luminescent material such as cesium iodide can be provided on a substratum particularly well by vapor deposition or cathode sputtering. These methods result in a luminescent layer which has a much denser composition, which is also due to the fact that no binder is present in this case. Consequently, a luminescent layer of this kind, being particularly suitable for X-ray luminescent screens, can be thinner and have a layer thickness of, for example, 200 microns. The layer thickness of the luminescent material is determined by the requirement that at least the major portion of the incident X-rays must be captured.

In the luminescent screen shown in FIG. 1, the layer of luminescent material 1 is covered with a separating layer 3. One of the functions of this separating layer is to protect a photocathode 4 which is made, for example, of caesium antimony and which is to be provided on the separating layer, from chemical damage by the luminescent material. The separating layer 3 is made of, for example, aluminum oxide. If a given electrical conductivity through the separating layer is desired, it can be achieved by providing this layer in the form of only partly oxidized aluminum.

According to the invention, the layer of luminescent material 1 is subdivided into small areas 6 by cracks 5. FIG. 2 shows a crack structure, viewed from a direction of incident radiation. The crack structure is determined, for example, by the type of luminescent material and the technique of depositing this material on the substratum, the temperature of the substratum during deposition of the luminescent material, the thermal expansion coefficients of the layer of luminescent material and of the substratum material, the thickness of the layer and the construction of the substratum. For example, a proper crack structure can be obtained in a cesium iodide layer as follows. The caesium iodide is provided (vapor deposited) on a substratum which is made of a material having an expansion coefficient of approximately 2.0 to $2.5\times10^{-5}$. During vapor deposition, the substratum is kept at a temperature of approximately 150° to 200° C., for example, by means of infrared radiators. After the layer has been deposited, the screen is gradually cooled. As the layer of luminescent material has an expansion coefficient of approximately 4.5 to $5.0\times10^{-5}$, the luminescent layer shrinks more than the substratum, so that cracks occur in the luminescent layer. Since the accompanying tensile forces are laterally directed in the layer, the cracks will extend mainly transverse to the layer. The refractive index of the luminescent material is larger than 1 so that total reflection will occur on the interfaces formed by the cracks, and the lateral light dispersion will thus be limited.

For making a luminescent screen for a given application, such as in this case an entrance screen for an X-ray image intensifier, the luminescent material and hence the layer thickness and the shape and the material of the substratum can often be considered as known factors. One of the remaining parameters also determining the crack structure is then the temperature of the substratum when the luminescent material is deposited. Even though some variation is possible in this respect, it is limited because in the case of a small temperature increase, or possibly a temperature decrease in the case of a reversed order of magnitude of the expansion coefficients, not enough cracks occur so that areas of a substantially varying dimension arise. An excessively high temperature of the substratum often results in the luminescent material becoming loose from the substratum.

A correct solution to this problem has been found in the layer thickness. It was found that the density of the cracks, which can also be referred to as the crack frequency, can be substantially influenced by the layer thickness of the luminescent material. A preferred method of composing a luminescent layer with an optimum crack frequency and very little spread in the dimensions of the areas, therefore, consists in first providing a sublayer on a substratum. The thickness of this sublayer is chosen to be such that an optimum crack structure is obtained. The screen is subsequently cooled, is heated again and is provided with a second sublayer. After the second, and possibly subsequent, cooling it appears that the crack structure in the first sublayer continues into the subsequently provided sublayers. The thickness of the subsequent sublayers preferably does not exceed that of the first sublayer. Particularly vapor-deposited cesium iodide screens having a layer thickness of approximately 200 microns and a very regular crack structure, resulting in areas of the desired dimension, have been realized by two or three successive vapor-deposition operations. This also offers the possibility of providing luminescent screens which are composed of multiple layers of different luminescent materials with a crack structure.

Another method of manufacturing a luminescent screen with a crack structure consists in making use of the substratum in which a given structure is provided on a surface on which the luminescent material is to be provided. This can be realized, for example, by impressing a gauze structure into the surface of the substratum, for example, according to known printing techniques. In a microscopical sense, the substratum surface is still flat, so that there are no upright partitions which would form the boundaries of the areas at a later stage. The microscopical irregularities in the surface of the substratum already suffice to initiate the pattern for the crack structure. So, according to this method the coarseness of the structure can be preprinted. The chance of a more regular structure as regards the size of the areas is also enhanced.

A layer which is subdivided into areas can also be realized by vapor deposition or sputtering on a gauze having a mesh size which corresponds to the desired crack structure. It was found that the luminescent material settles preferably on the wires of the gauze, so that small columns of material grow thereon. It is then desirable to provide a thermally insulating plate, for example, a glass plate underneath the gauze. For X-ray luminescent screens a braided gauze having a pitch of 50 to 75 microns can be used. For display screens for image intensifier tubes a gauze having a pitch of 5 to 7.5 microns can be used. Materials such as, for example, copper, nickel or molybdenum can be used as the gauze material. Columns which have grown together, which occasionally occur when flat gauzes are used, can be separated from each other by a thermal treatment which causes cracking of the luminescent material.

The spatially separated areas of a luminescent layer according to the invention are separated from each other in an active layer by vacuum interfaces. Due to the difference in the refractive indices, (total) reflection will occur on the interfaces, so that an optical separation is realized. Consequently, the resolution of the layer is increased. For special applications it can be advantageous to fill the cracks. This can be readily realized, for example, by drenching a cracked layer in a thermoplastic matter having the desired properties or in a binder in which the matters having the desired propeties are dissolved or suspended. According to this method, the cracks can be rendered, for example, fully impervious to light or X-ray absorbing. In this screen the quantity of transmitted X-rays or outside incident light on a screen is thus reduced. In these screens there is also a selection as regards incident rays. This is because rays which are incident at an angle will be captured for a major part by the cracks which are now filled. Consequently, a screen of this kind also has a kind of Bucky action. The latter can be used to good advantage, for example, for screens which are coupled, on the entrance side of the radiation to be detected, to a fibre-optical plate or to a channel intensifier plate. Plates of this kind have a large opening angle for the emitted rays or particles (electrons). An external dispersion in the luminescent layer to be anticipated as a result thereof can be greatly reduced by the absorbing interfaces. In this context external dispersion is to be understood to mean the dispersion which occurs because the radiation incident on the luminescent layer is insufficiently collimated. A screen of this kind can also combine the functions of an X-ray fluorescent screen and a dispersion raster in X-ray apparatus where a target is arranged closely behind a transparency to be irradiated. In this respect we think of, for example, examinations of foils of material which are arranged near a luminescent screen, possibly with insertion of a fibre-optical plate. In the case of multiple layers as described above, it is also possible to fill the cracks in each individual sublayer with appropriate materials.

An X-ray intensifier tube 7 as diagrammatically shown in FIG. 3 receives X-rays 8 which originate from an X-ray source 9 and which irradiate a transparent object 10 to be examined. The X-ray intensifier tube 7 comprises an envelope 11, comprising an entrance window 12 and an observation window 13. The envelope and the windows are preferably made of glass, the windows sometimes being made of fibre-optical plates, but particularly the entrance window can also be made of metal, as already stated. The windows preferably form substrata for luminescent layers to be provided thereon. A luminescent layer 14 is provided on the entrance window 12 according to one of the described methods according to the invention. The luminescent material is preferably cesium iodide, and the layer thickness is, for example, 200 microns. Provided on the layer of luminescent material 14 is a separating layer 15 and a photocathode, both having a construction, for example, as shown in FIG. 1. The electrically conductive photocathode is fed out via a passage 17. For the acceleration and the display on the observation window 13 of electrons emitted by the photocathode, the envelope accommodates an auxiliary electrode 18 having a passage 19, a first anode 20 having a passage 21, and possibly a second anode 22 having a passage 23. The second anode 22 is mounted on the first anode with insertion of electrically insulating interrupters 24, in the form of, for example, glass beads. Provided on the observation window 13 are a luminescent layer 25, which is made of, for example, cesium iodide and has a thickness of approximately 5 microns, and an electrically conductive, for example, light reflecting layer 26. The layer 26 is connected to the first anode via an electrical contact 27. As the entrance luminescent screen often limits the resolution of the system in known image intensifiers of this kind, a luminescent screen having a crack structure according to the invention will notably be used for this purpose. The aim can be a crack frequency of approximately 120 to 125 lines per cm. This produces areas having a mean lateral dimension of approximately 100 microns. A few comparatively large areas having a dimension of, for example, 500 microns, will not seriously affect the image quality. These large areas, however, can give rise to local potential gradients which are capable of disturbing the homogeneity in the photoelectrons.

If the entrance screen is provided with a luminescent layer according to the invention, the observation screen can determine the resolution in the case of proper electronoptical imaging in the tube. It then makes sense to provide the observation screen also with a luminescent layer with a crack structure. The crack frequency must then be adapted to the ratio of the dimensions of the entrance screen and the observation screen, and will be, for example, approximately a factor 10 higher than that of the entrance screen. This results in approximately 100 cracks per mm, so that areas having on the average a dimension of approximately 10 microns are produced.

The X-ray image intensifer tube merely serves as an example of an application of a luminescent screen according to the invention. As the entrance screen is comparatively thick, the advantages are quite significant. However, various other applications are feasible such as, for example, in light intensifiers, including infrared viewers, gamma detectors, electron microscopes, oscilloscope tubes, high quality television display tubes, for example, for measuring monitors and similar apparatus.

What is claimed is:

1. A method for forming a luminescent screen, comprising the steps of:

adhering a luminescent layer to a substratum having a coefficient of thermal expansion different from said luminescent layer; and changing the temperature of both said substratum and said adhering luminescent layer from the temperature at which said adhering occurred in a direction which due to the different coefficients of thermal expansion creates laterally directed tensile forces in said luminescent layer sufficient to crack said layer into a closely spaced mosaic pattern of discrete luminescent areas.

2. A method for forming a luminescent screen as claimed in claim 1 wherein said luminescent layer comprises grains of luminescent material and binder material to form said grains into a cohesive and adhering layer.

3. A method for forming a luminescent screen as claimed in claim 2 wherein said luminescent layer has a thickness of approximately 400 microns.

4. A method for forming a luminescent screen as claimed in claim 1 wherein said luminescent layer is substantially composed of luminescent material.

5. A method for forming a luminescent screen as claimed in claim 4 wherein said luminescent layer has a thickness of approximately 200 microns.

6. A method for forming a luminescent screen as claimed in claim 5 wherein said luminescent material is cesium iodide.

7. A method for forming a luminescent screen as claimed in claim 1 wherein said substratum is composed of a metallic material.

8. A method for forming a luminescent screen as claimed in claim 1 wherein the coefficient of thermal expansion of said luminescent layer is greater than the coefficient of thermal expansion of said substratum and in the temperature changing step the temperature is lowered.

9. A method for forming a luminescent screen as claimed in claim 1 further comprising the steps of:

adhering to said previously cracked luminescent layer an additional luminescent layer having a coefficient of thermal expansion different from said substratum; and changing the temperature of said substratum and said previously cracked layer and said additional luminescent layer all from the temperature at which the second adhering step occurred in a direction which due to the different coefficients of thermal expansion creates laterally directed tensile forces in said additional luminescent layer sufficient to crack said additional layer substantially along the crack lines of said previously cracked layer.

10. A method for forming a luminescent screen as claimed in claim 9 wherein said second luminescent layer has a different composition from said first deposited luminescent layer.

11. A method for forming a luminescent screen as claimed in claim 1 further comprising the additional step of impressing on the surface of said substratum a desired mosaic pattern before adhering said luminescent layer thereto in order to concentrate said tensile forces within said layer along said desired pattern, thereby substantially cracking said layer into a pattern corresponding with said desired mosaic pattern.

12. A method for forming a luminescent screen as claimed in claim 1 further comprising the additional steps of:

depositing on said cracked luminescent layer a chemical contamination isolating layer of material; and depositing on said isolating layer of material a conductive layer of material suitable for use as a photocathode.

13. A method for forming a luminescent screen as claimed in claim 12 wherein said isolating layer comprises a layer of partially oxidized aluminum.

14. A method for forming a luminescent screen as claimed in claim 12 wherein said isolating layer is composed of aluminum oxide and said photocathode layer is composed of cesium antimony.

15. A method for forming a luminescent screen as claimed in claim 1 further comprising the additional step of filling the spaces between said closely spaced mosaic pattern of discrete luminescent areas with electromagnetic radiation absorbing material.

16. A method for forming a luminescent screen, comprising the steps of:

mounting a metallic gauze on a substratum; and depositing a luminescent material onto said metallic gauze by vapor deposition or cathode sputtering, thereby forming columns of luminescent material perpendicular to said gauze, said columns at least to some extent remaining distinct from one another.

17. A method for forming a luminescent screen as claimed in claim 16 further comprising the additional step of heat treating said screen to crack apart any columns which have been joined in the forming step.

*18. A luminescent screen comprising:*

*a substratum,*

*a luminescent layer adhered to said substratum and having a coefficient of thermal expansion different from that of said substratum,*

*said luminescent layer having a plurality of discrete luminescent areas separated by cracks and forming a closely spaced mosaic pattern, said mosaic pattern being produced by changing the temperature of both said substratum and said layer adhered thereto from the temperature at which the adhering occurred in a direction which due to the different coefficients of thermal expansion creates laterally directed tensile forces in said layer sufficient to form said cracks therein.*

*19. In an X-ray image intensifier including a screen for converting X-radiation into visible radiation, a photocathode responsive to the visible radiation for producing an electron-optical image therefrom, and a receiving screen for converting the electron-optical image into a visible image, the improvement wherein the screen for converting X-ray radiation into visible radiation consists essentially of a layer of cesium iodide having closely spaced mosaic pattern of discrete areas adhered to a substrate by vapor deposition, and produced by changing the temperature of both the substrate and the cesium iodide from the temperature at which said layer was adhered in a direction which due to the different coefficients of thermal expansion creates laterally directed tensile forces in said layer sufficient to crack said layer.*

*20. An X-ray image intensifier as claimed in claim 19 in which the layer has a thickness of approximately 200 microns.*

*21. An X-ray image intensifier as claimed in claim 20 in which the layer has a crack frequency of approximately* 125 lines per cm.

*22. An X-ray image intensifier as claimed in claim 19 in which the layer has a crack frequency of approximately 125 lines per cm.*

*having a closely spaced mosaic pattern of discrete areas adhered to the first-named layer by vapor deposition, said mosaic pattern of said additional layer being formed by changing the temperature of said substrate and said first layer and said additional layer all from the temperature at which adhering of said additional layer occurred in a direction which due to the different coefficients of thermal expansion creates laterally directed tensile forces in said additional layer sufficient to crack said additional layer substantially along the crack lines of said first-named layer.*

* * * * *

UNITED STATES PATENT AND TRADEMARK OFFICE

CERTIFICATE OF CORRECTION

PATENT NO. : REISSUE 29956

DATED : April 3, 1979

INVENTOR(S) : MARTINUS A.C. LIGHTENBERG ET AL

It is certified that error appears in the above-identified patent and that said Letters Patent are hereby corrected as shown below:

Claim 22, Col. 8, lines 10 and 11, delete the lines and insert

--which the screen for converting x-ray radiation into visible radiation includes an additional layer of cesium iodide--

Signed and Sealed this

*Nineteenth* Day of *February 1980*

[SEAL]

*Attest:*

SIDNEY A. DIAMOND

*Attesting Officer*

*Commissioner of Patents and Trademarks*